No. 664,719. Patented Dec. 25, 1900.
J. R. BRINCK.
MINNOW BUCKET.
(Application filed June 18, 1900.)
(No Model.)
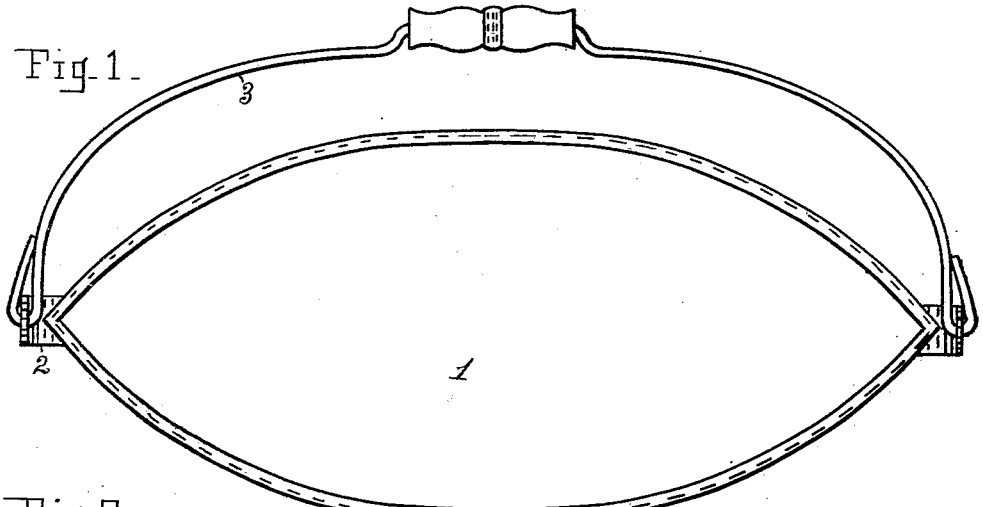
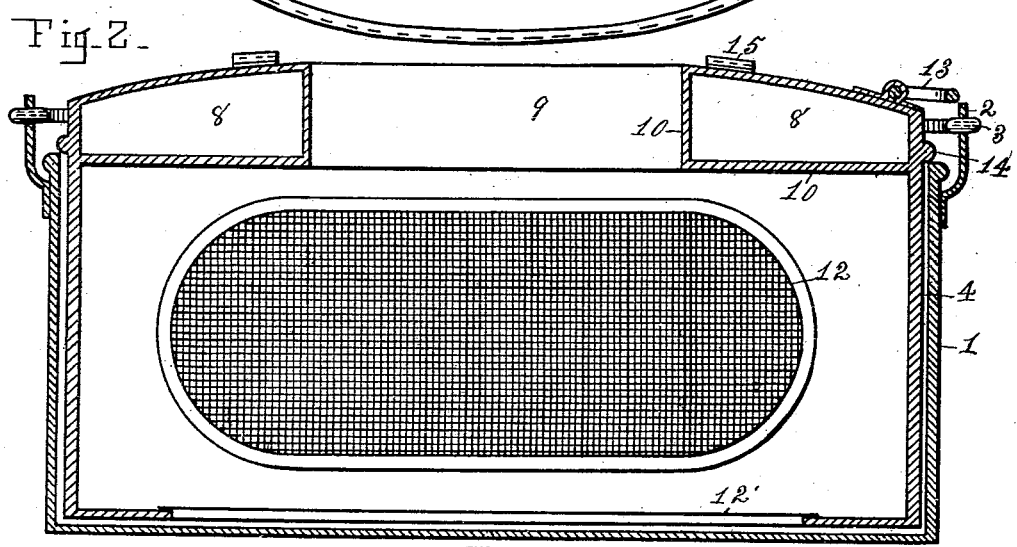
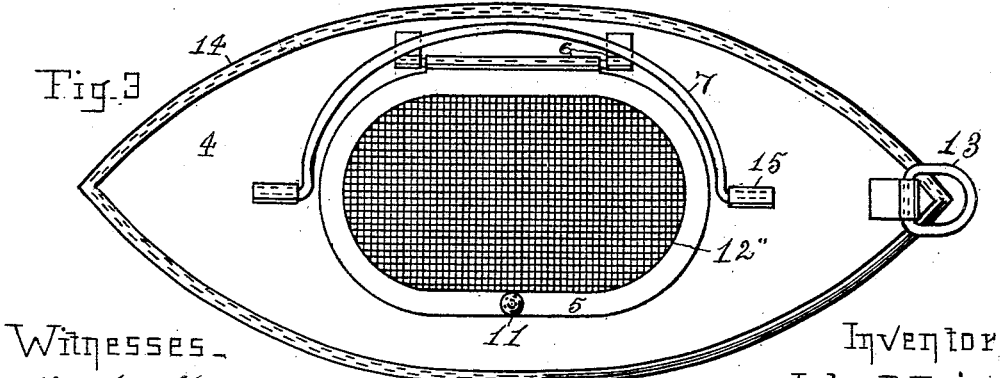
Witnesses
E. M. Albee
Heman Miller
Inventor
John R. Brinck
by G. H. Albee, Attorney.
THE NORRIS PETERS CO., PHOTO-LITHO., WASHINGTON, D. C.

UNITED STATES PATENT OFFICE.

JOHN R. BRINCK, OF APPLETON, WISCONSIN, ASSIGNOR OF ONE-HALF TO J. H. KAMPS, OF SAME PLACE.

MINNOW-BUCKET.

SPECIFICATION forming part of Letters Patent No. 664,719, dated December 25, 1900.

Application filed June 18, 1900. Serial No. 20,686. (No model.)

*To all whom it may concern:*

Be it known that I, JOHN R. BRINCK, a citizen of the United States, residing at Appleton, in the county of Outagamie and State of Wisconsin, have invented a new and useful Improvement in Minnow-Buckets, of which the following is a specification.

My invention relates to portable buckets for carrying live minnows for fish-bait; and its object is to provide a light receptacle adapted for holding water into which the minnows can be placed, kept alive, and carried from place to place conveniently, and after arriving at a body of water from which fish are expected to be caught said minnow-bucket can be placed in said body of water and towed along with the boat which the fishermen occupy.

The complete minnow-bucket consists of two parts, an outer one for water and an inner one for the minnows, the receptacle for holding the water being provided with a removable inner receptacle having perforations for admitting air and water, and within which receptacle the minnows are to be placed.

My improvement is illustrated in the accompanying drawings, in which—

Figure 1 is a plan or top view of the outer or water-holding receptacle. Fig. 2 is a vertical section, through the longitudinal center of Figs. 1 and 3, of the outer and inner receptacles, the lid of the inner one being removed. Fig. 3 is a plan of the top of the inner receptacle.

Similar numerals indicate like parts in the several views.

1 indicates the outer or water-holding receptacle; 2, bail-ears upon opposite ends of the receptacle; 3, a bail-handle by which the outer receptacle or the two receptacles when nested together can be carried by the hand; 4, the inner receptacle; 5, a lid hinged with the hinge 6 to the top of the inner receptacle; 7, a wire bail by means of which the inner receptacle can be lifted into or out of the outer one; 8, an air-chamber which occupies the upper portion of the inner receptacle around the opening 9; 10, the inner walls of the air-chamber; 11, a knob-fastening for the lid 5; 12 12' 12'', wire-cloth or perforated metal in the sides, bottom, and lid, respectively, of the inner receptacle; 13, a ring to which a rope can be connected for towing the inner receptacle along with a fishing-boat; 14, a wire bead around the inner receptacle for supporting it upon the walls or upper edge of the outer receptacle.

The outer receptacle is formed of tin or a similar light material and of a size for being carried by the hand conveniently. It is of much greater length than breadth, with pointed ends, oval sides, and flat bottom. The end and side walls which inclose the two receptacles are vertical, and the extreme ends are formed into a sharp point, so that either end of the inner receptacle when placed in a body of water to be floated will serve as a "cutwater" and pass easily through the water. The inner receptacle is of a similar form horizontally and of a size to be nested within the outer one. It is somewhat higher than the outer one and is provided with an air-chamber 8 in its upper portion. It is provided with an opening 9 through the air-chamber to the interior and with a lid 5 for covering said opening, and the outer covering is perforated for admitting air and water, preferably the sides, bottom, and lid being largely of wire-cloth or perforated metal. The two parts are made alike in form horizontally for the purpose of being nested together and of the form as shown and described, so that when separated and the inner one filled with a supply of minnows it can be floated either end forward along with the boat the fishermen occupy in the body of water from which fish are expected to be caught.

In using the minnow-bucket the outer receptacle is to be filled with water and the minnows placed in the inner one through the opening 9, the lid securely closed, and said inner receptacle then placed within the outer one, when the complete minnow-bucket can be carried from place to place. Upon arriving at a body of water the inner receptacle is to be removed from the outer one, a rope attached to it and to a boat, and placed in the body of water, where it will float along with the boat, the perforations in it keeping the minnows provided with an abundant supply of fresh water, while the air-chamber causes the receptacle to float near the surface of said body of water, where the minnows can be procured as wanted through the opening 9.

At each end of the inner receptacle the sides and bottom are imperforate for about one-third of the distance from the end to the center, and an imperforate strip is carried along the joints between the sides, the air-chamber, and bottom, whereby the minnow-holder is made strong and rigid, and whichever end forward it may be when being towed along after a boat by reason of the imperforate ends there will be a protected recess at one end, into which the minnows can gather and be protected from the direct rush of water through the holder. The outer walls being vertical, the area of the receptacle upon a horizontal plane at any point in its height up to the air-chamber 8 and the area of its bottom are equal, so that its sides and bottom contain sufficient weight of metal for ballast without placing an extra weight upon its bottom in order to preserve the vertical position of the bucket when floating.

An advantage in forming the bucket of two parts, the outer one for water and the inner one for minnows, is that when the fishermen are fishing along the bank of a body of water and carrying the minnows as they decrease in numbers in the bucket it becomes harder and finally almost impossible to catch one while the minnows have a bucketful of water in which to swim; but by lifting the inner receptacle from the outer one the water will drain into the outer one and leave the minnows exposed, so that the desired number can be easily caught and the rest then returned to the water in the outer receptacle.

Having described my invention, what I claim, and desire to secure by Letters Patent, is—

1. A minnow-bucket for carrying minnows for fish-bait, having its length largely exceeding its breadth with similar sharp-pointed ends, oval sides and a flat bottom, and comprising two parts, an outer part for holding water and an inner part for holding minnows, the inclosing end and side walls of both parts being vertical, the inner part having an air-chamber entirely around it in its upper part with an opening through it to the minnow-receptacle, said inner part being imperforate from each end and along each side approximately one-third of the distance to the center, and being adapted for being nested within the outer part and to float near the surface when separated from the outer part and placed in a body of water for being towed along with a fisherman's boat, substantially as described.

2. A minnow-bucket, comprising an outer receptacle for holding water of a length largely exceeding its breadth, with sharp-pointed ends, oval sides and flat bottom, its end and side inclosing walls being vertical and being provided with a bail for carrying said receptacle, an inner receptacle of a similar form upon a horizontal plane and being adapted for nesting within the outer receptacle, being imperforate from each end along each side approximately one-third of the distance to its center, and said inner receptacle having an air-chamber entirely around it in its upper portion, an opening through said air-chamber around its longitudinal and transverse center, to the interior of said inner receptacle, a perforated lid for closing said opening, perforations in the bottom and oval sides of the inner receptacle, a ring or similar device upon the inner receptacle to which a rope may be attached for towing said receptacle along with a boat through a body of water and a bail for lifting the inner receptacle into and out of the outer one, substantially as described.

3. In a minnow-bucket for carrying minnows for fish-bait, the combination of an outer receptacle adapted for holding water, having a length largely exceeding its breadth with sharp-pointed ends, oval sides and flat bottom, and a bail for carrying said receptacle, an inner receptacle imperforate from each end along each side approximately one-third of the distance to the center, and being adapted for nesting within the outer one, the inclosing end and side walls of both receptacles being vertical, an air-chamber in the upper portion of the inner receptacle entirely around its longitudinal and transverse center, an opening through said air-chamber to the interior of said receptacle, a lid for covering said opening, perforations in the body of said receptacle below the air-chamber, a device to which a rope may be attached for towing it along with a boat through a body of water, and a bail for lifting the inner receptacle into or out of the outer one, substantially as described.

J. R. BRINCK.

Witnesses:
W. C. DUNN,
S. D. BAIRD.